US005521486A

United States Patent [19]
Takamoto et al.

[11] Patent Number: 5,521,486
[45] Date of Patent: May 28, 1996

[54] CHARGING GENERATOR WITH SELF-DIAGNOSIS FUNCTION

[75] Inventors: Nobuo Takamoto, Higashimurayama; Yuji Maeda, Hitachioota; Sakae Hikita, Hitachinaka; Katsuji Marumoto, Hitachi, all of Japan

[73] Assignees: Hitachi, Ltd., Tokyo; Hitachi Automotive Engineering Co., Ltd., Ibaraki, both of Japan

[21] Appl. No.: 360,968

[22] Filed: Dec. 21, 1994

[30] Foreign Application Priority Data

Dec. 24, 1993 [JP] Japan ................................. 5-326603

[51] Int. Cl.$^6$ ................................................ H02J 7/24
[52] U.S. Cl. ........................................... 322/99; 322/28
[58] Field of Search ................................. 322/28; 320/61, 320/64

[56] References Cited

U.S. PATENT DOCUMENTS

| | | | |
|---|---|---|---|
| 4,379,990 | 4/1983 | Sievers et al. | 322/99 |
| 4,583,036 | 4/1986 | Morishita et al. | 320/39 |
| 4,584,515 | 4/1986 | Edwards | 322/28 |
| 4,623,833 | 11/1986 | Edwards | 322/28 |
| 4,651,081 | 3/1987 | Nishimura et al. | 320/64 |
| 4,670,705 | 6/1987 | Sievers et al. | 322/28 |
| 4,682,097 | 7/1987 | Matsui | 320/427 |
| 4,719,427 | 1/1988 | Morishita et al. | 324/427 |

*Primary Examiner*—Steven L. Stephan
*Assistant Examiner*—Nicholas Ponomarenko
*Attorney, Agent, or Firm*—Antonelli, Terry, Stout & Kraus

[57] ABSTRACT

A charging generator having a self-diagnosis function includes a self-diagnosis circuit, a storage device and an output device. When an anomaly is detected, the charging generator with a self-diagnosis function stores data concerning at least one anomalous condition of the generator and the contents of the anomaly in the storage device, and outputs the anomalous data concerning the generator or the contents of the anomaly, which are stored in the storage device, by inputting a specific signal from the outside.

12 Claims, 6 Drawing Sheets

```
          SELF-DIAGNOSIS SYSTEM
○ DIAGNOSIS
  RESULTS   : _____

○ DATA OF PRESENT
  STATES
      Vs : _____ V        VB   : _____ V
      IF : _____ A        NALT : _____ r/min ○ DATA OF ANOMALY
  OCCURRING STATES
      Vs : _____ V        VB   : _____ V
      IF : _____ A        NALT : _____ r/min
```

5,521,486

CHARGING GENERATOR WITH SELF-DIAGNOSIS FUNCTION

BACKGROUND OF THE INVENTION

The present invention relates to a charging generator having a self-diagnosis function, and particularly to a charging generator with a self-diagnosis function for a vehicle driven by an internal combustion engine.

It is known that, in a conventional diagnosis apparatus for a charging generator system, such as an alternating current generator, as described by Japanese Patent Application Laid-Open 195436/1983, information concerning various parts of the charging generator system is collected, the charging generator system is diagnosed, and the diagnosis results are instantly displayed on a display device. The above-mentioned conventional diagnosis apparatus can send alarms to an operator when anomalies are detected in the system and they continue in the case of detecting various anomalies in a charging generator system. However, an operator sometimes can not recognize an alarm, since the alarm may be generated only one time, if the anomaly has occurred under special conditions. Therefore, such a conventional diagnosis apparatus is not sufficiently useful to a maintenance man or an inspector.

SUMMARY OF THE INVENTION

The present invention has been achieved in consideration of the above-described problems, and has the objective of supporting confirmation of the occurrence of an anomaly in a charging generator system and clarification of various anomalies by holding information as to at least one anomaly and the anomaly contents in a storage means and outputting the stored contents in response to an input signal from the outside of the charging generator as occasion demands.

Another object of the present invention is to diagnose the charging generator system more accurately and to send information concerning the charging generator system successively to an operator, and further to give a maintenance man or an inspector the information at the time of occurrence of the anomaly, by monitoring input and output signals of a control circuit using a diagnosis circuit, both circuits being provided in a charging generator having the diagnosis means according to the present invention.

A further object of the present invention is to output stored data related to a charging generator or a voltage adjusting unit and to identify the anomaly situation, more easily, to a maintenance man or an inspector, by connecting an information processor, such as a personal computer, to the diagnosis circuit as occasion demands.

A feature of the present invention is to hold at least one group of anomaly data and anomaly contents and to output the held data using an output by detecting an input of a specific signal from the outside of the apparatus when the held data is needed, in a charging generator having a self-diagnosis function, including a self-diagnosing means, a storage means and an output means. By the above-mentioned feature, the function of self-diagnosis for supporting confirmation of the occurrence of an anomaly situation and clarification of the anomalies can be realized.

By the above-mentioned self-diagnosis function, it is possible to hold data as to at least one of anomaly data and anomaly contents in a storage means on the occurrence of an anomaly in the apparatus and to output the contents of the storage means by detecting a specific input signal of a specific voltage or a specific pulse as occasion demands.

DETAILED DESCRIPTION OF THE EMBODIMENTS

Figure 1:
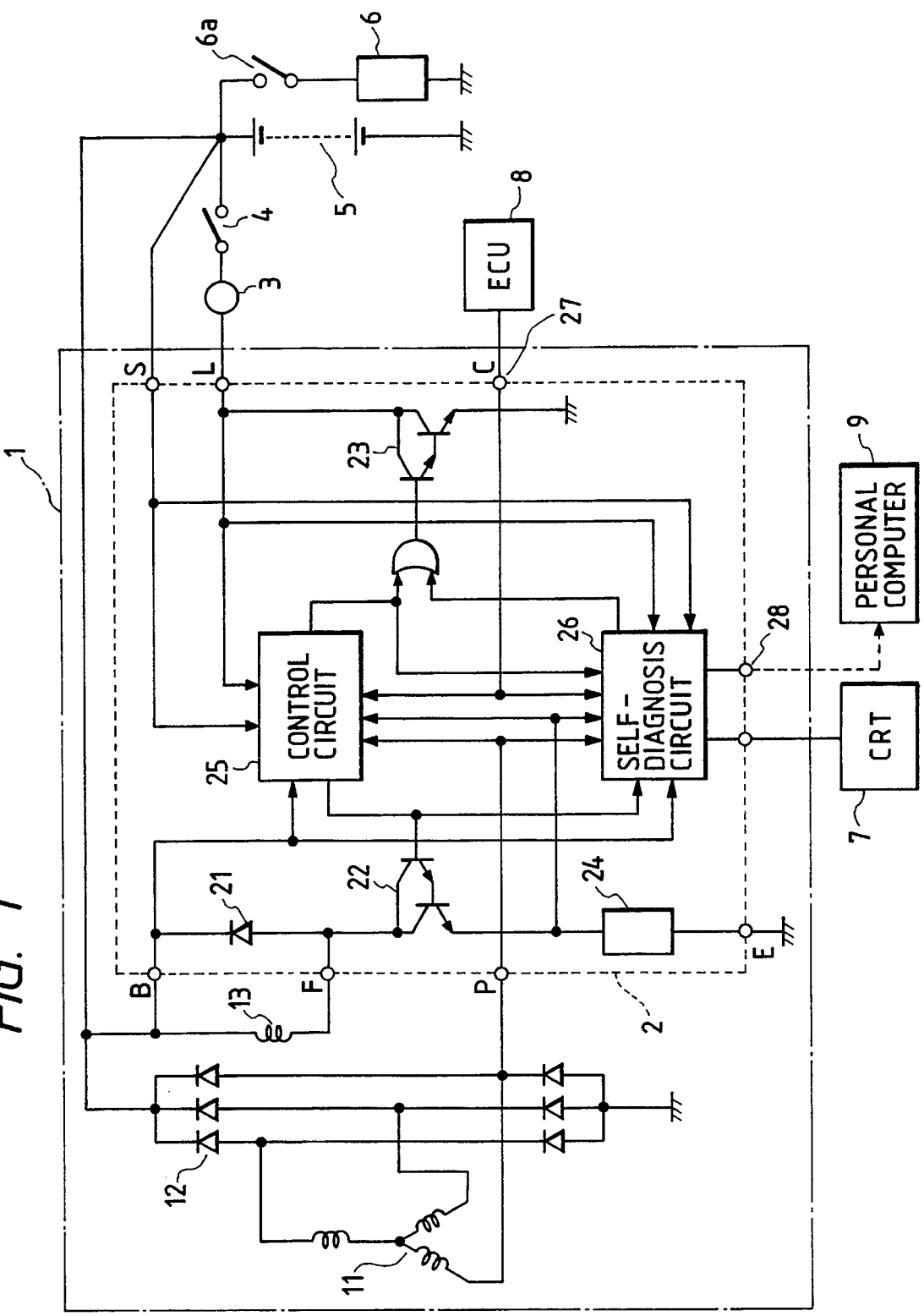
FIG. 1 is a circuit diagram of a charging generator forming an embodiment by the present invention.

Hereinafter, details of the present invention will be explained based on embodiments illustrated in the drawings.

FIG. 1 is a circuit diagram of a charging generator having a self-diagnosis function as installed in a vehicle. The generator 1 includes an armature winding 11, a three phase full wave rectifier 12 for converting alternating currents generated in the armature winding 11 to direct currents and a field winding 13. Further, the generator 1 is connected to the following equipment, that is, a voltage adjustment unit 2, a charge lamp 3, an engine key switch 4 a battery 5 charged by the generator 1 for feeding currents to an outside load 6 via a switch 6a, a display device 7 (CRT), an engine control unit 8 and a personal computer 9.

In the following, the voltage adjustment unit 2 will be explained in detail. The numeral 21 represents a flywheel diode for leaking a flyback current to the B terminal when a power transistor 22 for driving the field winding 13 turns OFF from the ON state. The numeral 23 represents a power transistor for driving the charge lamp 3. The numeral 24 designates a shunt resistance for detecting a field current and the numeral 25 designates a control circuit for driving ON-OFF operations of the power transistor 23. The numeral 26 represents a self-diagnosis circuit. The numeral 27 designates C terminal for inputting a control signal to control the voltage adjustment from the outside of the present charging generator (hereinafter referred to as the C terminal) and the numeral 28 designates an output terminal for outputting information from the above-mentioned self-diagnosis circuit 26 to an outside personal computer 9.

Figure 2:
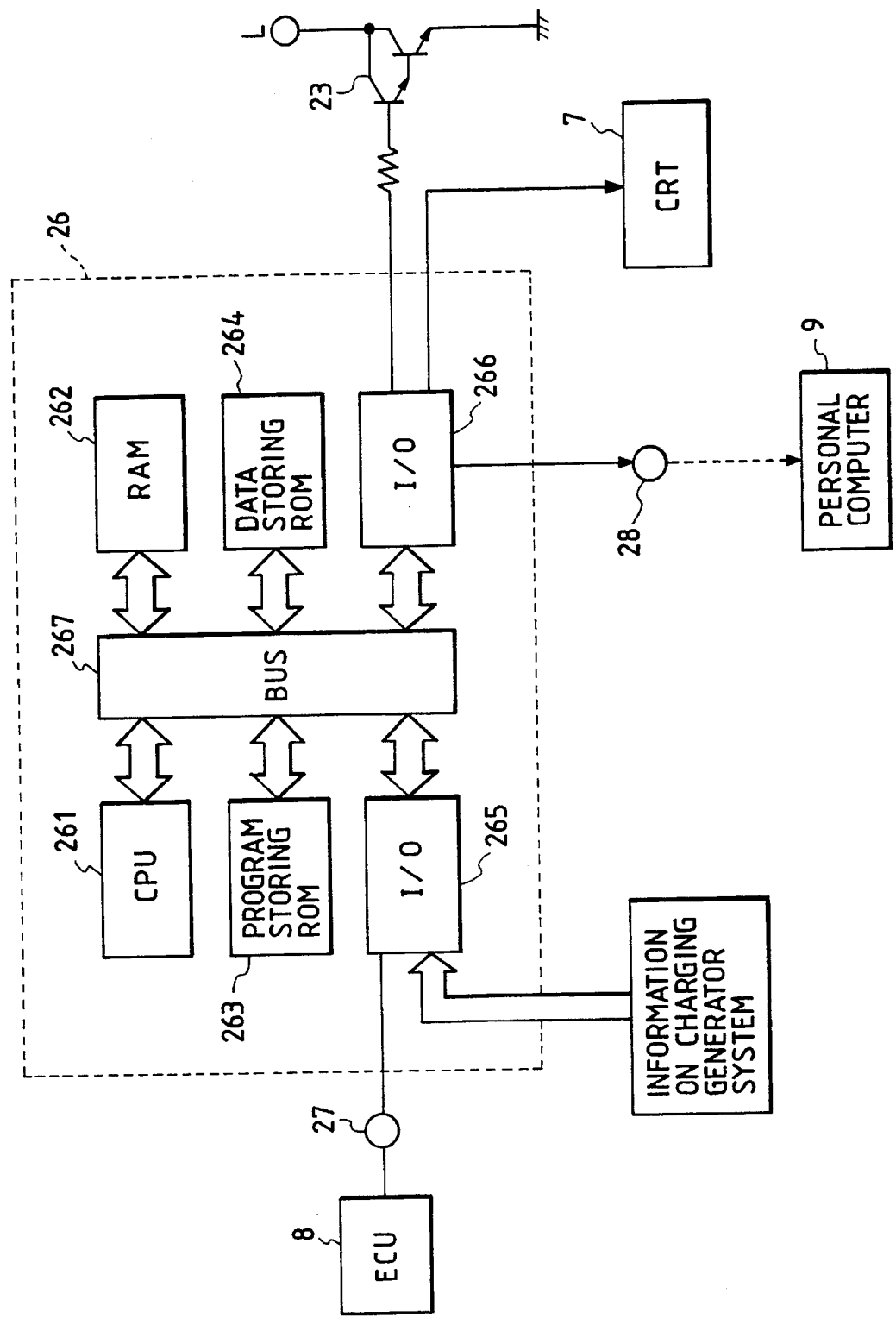
FIG. 2 is a block diagram of a self-diagnosis circuit according to the present invention.

FIG. 2 shows a configuration of the self-diagnosis circuit 26 to which, for example, a microcomputer is applied. The self-diagnosis circuit 26 shown by the figure comprises a CPU 261 for computation, a RAM 262 used for data storing and computation, a ROM 263 for storing programs and a writable ROM 264 which is used as a nonvolatile memory. Further, the circuit includes an I/O register 265 for inputting signals from the C terminal 27 and the information concerning the charging generator system, an I/O register 266 for outputting the drive signals to the power transistor 23, the signals displayed on a CRT 7 and the signals sent to the outside personal computer 9, and a BUS line 267.

Figure 3:
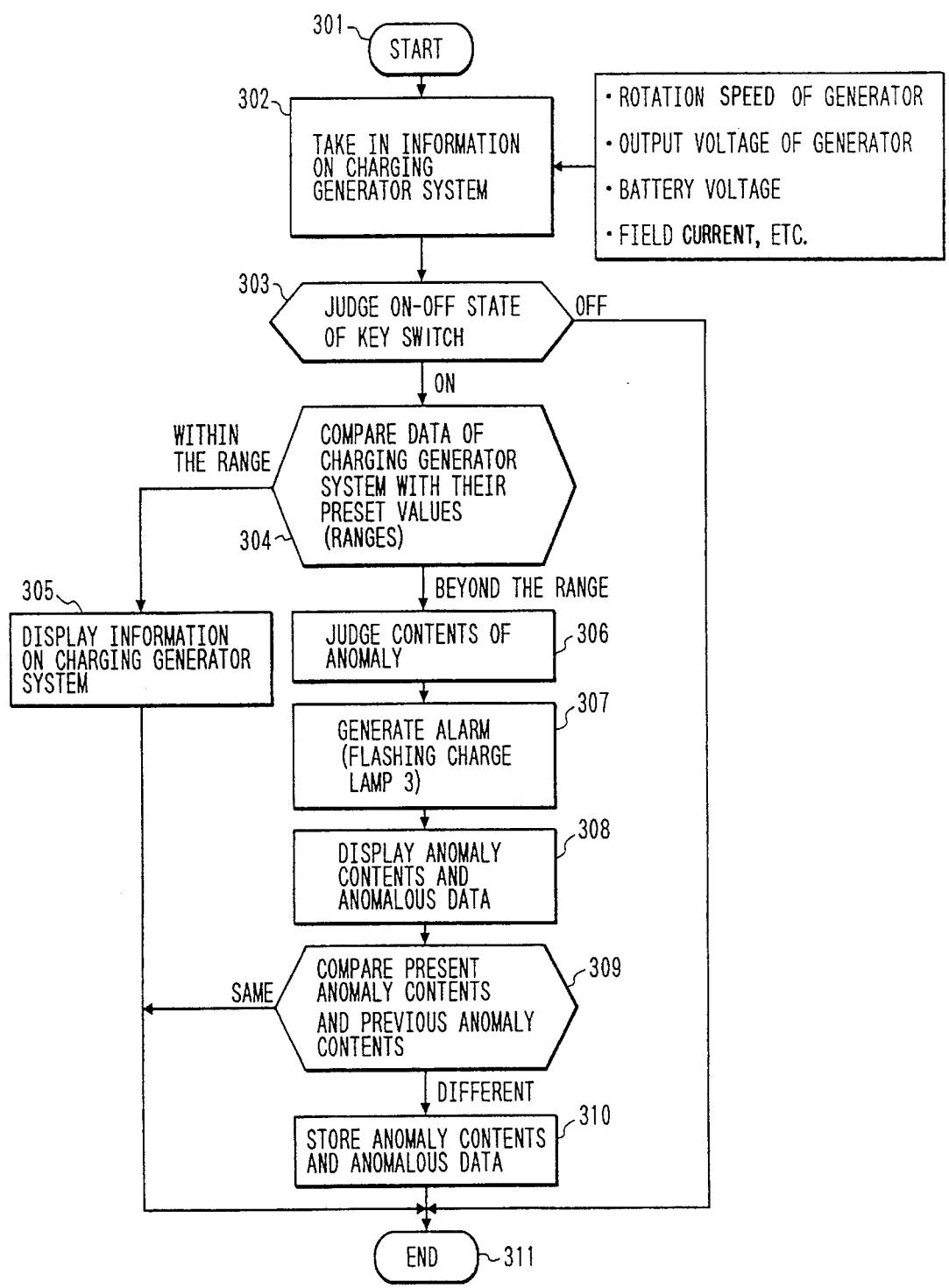
FIG. 3 is a flow chart of the self-diagnosis process according to by the present invention.

In the following, operations of the embodiment having the above-mentioned constitution will be explained will reference to FIGS. 1, 3 and 4. FIG. 3 is a flow chart showing the operations of the embodiment in the normal state. At first, by turning on the key switch 4 of the engine, the voltage adjustment unit 2 starts and the programs stored in ROM 263 are executed. Next, initial exciting currents are caused to flow in the field winding 13, by ON-OFF control of the power transistor 22 with a constant conduction rate, by the control circuit 25, and the charge lamp 3 is turned on. Then, the generator 1 is driven via a generator drive belt (not shown in the figure) by the engine during starting of the engine, and alternating currents are induced in the armature winding 11 and fed to the battery 5, the voltage adjustment unit 2, the external load 6 and so on after being rectified by the three phase full wave rectifier 12. Simultaneously, the start of power generation by the generator 1 is detected by the control circuit 25, and the power transistor 23 is turned to the non-conduction state and the charge lamp 3 is turned off. And, voltage control by controlling the conduction rate of the power transistor 22 so as to obtain the optimal output voltage is started by detecting the terminal voltage of the battery 5. In the above-mentioned generating states, at the step 302, such information concerning the charging generator system as the rotation speed of the generator, output voltage of the generator battery voltage, the field currents, etc. is taken into RAM 262. At the step 303, the state of the key switch 4 is read out, and if it is in ON state, the process goes to the step 304; otherwise, the process goes to an end. At the step 304, each of the various kinds of information taken into RAM 262 is compared with a predetermined value or range, and if it equals the predetermined value or exists within the predetermined range, the information on the charging generator system is displayed on the display device 7 at the step 305 and the process goes to an end. Otherwise, the information is judged as anomalous and the process goes to the step 306.

At the step 306, such anomalies as interruption of lines wired in the charging generator system, wiring detachment at connection terminals, a short circuit of the power transistor, slipping or interruption of the generator drive belt, etc. are judged based on the information determined as anomalous at the step 304, and, based on a signal corresponding to the contents of the anomaly, at the step 307, an alarm indicating an anomaly occurrence is indicated to an operator by driving the power transistor 23 and flashing the charge lamp 3. The contents of the anomaly are also displayed to the operator.

At the step 308, the information concerning the charging generator in the anomalous state and the contents of the anomaly are displayed on CRT 7. And, at the step 309, the contents of the anomaly stored in ROM 264 are taken into RAM 262 and the previous contents are compared with the present contents. If both are the same, the process goes to an end; otherwise, the present contents are stored in ROM 264 and the process goes to an end. The above-mentioned process is executed in a preset period during the ON state of the key switch 4. Then, it is possible to store the contents of each anomaly in time series and to offer information useful for confirming the situation at the occurence of an anomaly and for inquiring into the cause of the anomaly.

Figure 4:
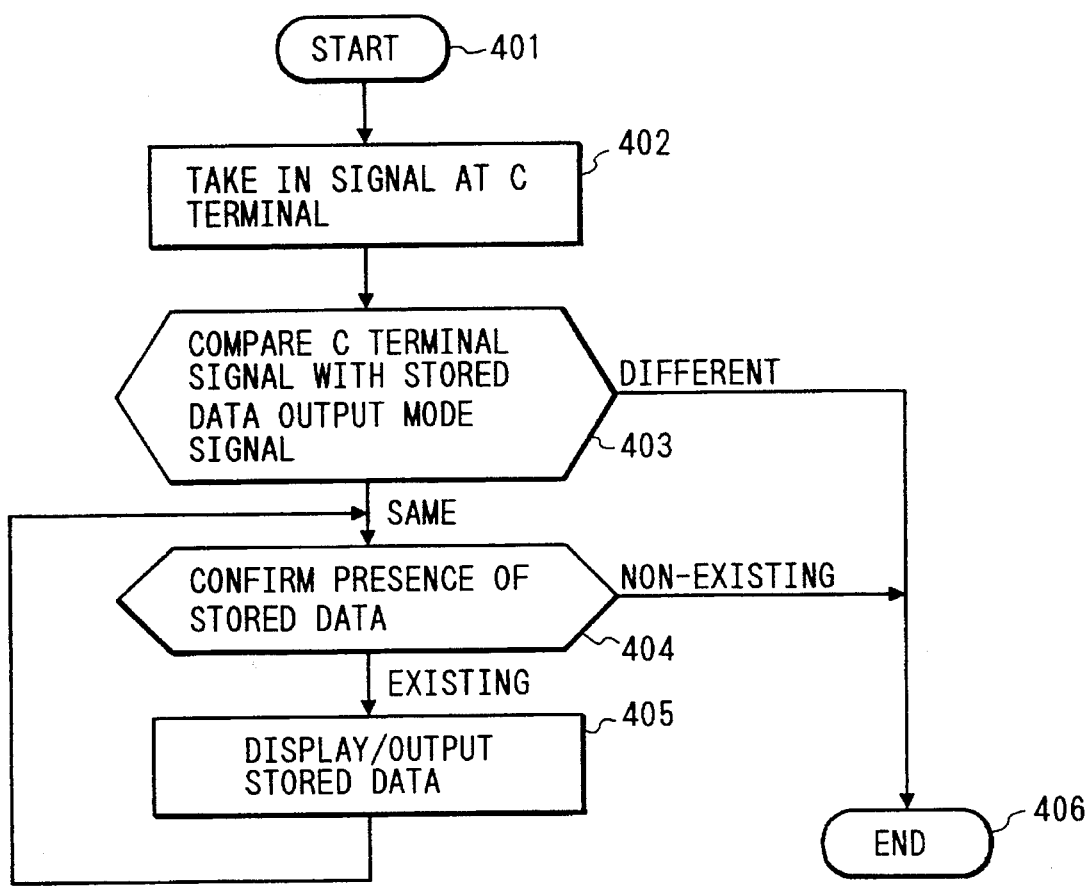
FIG. 4 is a flow chart of the stored data outputting process according to the present invention.

In FIG. 4, a flow chart of the procedure for outputting the stored data is shown. At the step 402, a signal at the C terminal is detected and the signal is taken into RAM 262.

At the step 403, the detected signal is compared with digital stored data of an output mode, and if both data are the same, the process goes to the step 404; otherwise, the process goes to an end.

Figures 5, 6:
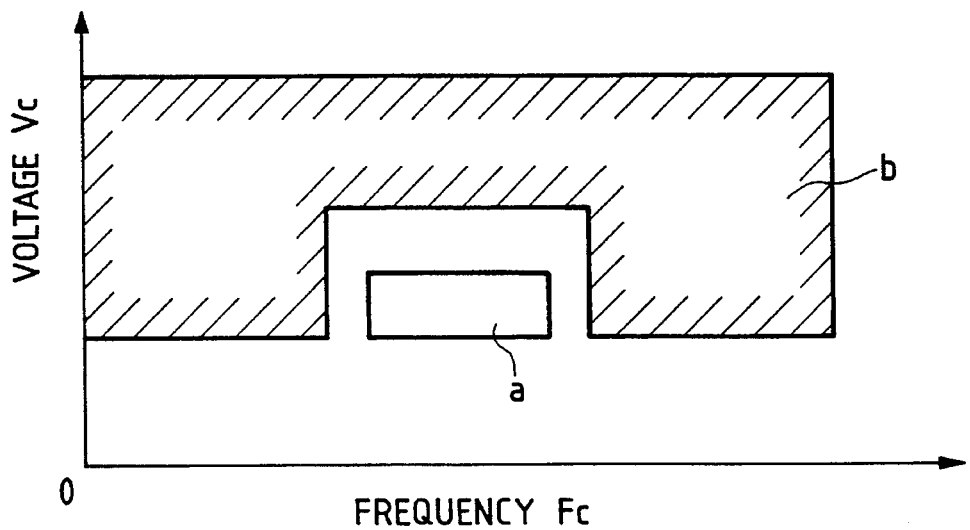
FIG. 5 is a diagram of a display format of a display device according to the present invention.
FIG. 6 is a diagram which shows the regions in voltage-frequency domain for separating the input control signals according to the present invention.

At the step 404. the presence of the data stored in ROM 264 is confirmed, and if the ROM does not contain any data, the process goes to an end. Otherwise, at the step 405, the stored data is displayed on CRT 7 in a form as shown by FIG. 5 or is output to a personal computer 9 via the output terminal 28, and then the process goes to the step 404. The aforementioned is the process for the data output mode, by which the stored data can be easily output.

Figure 7:
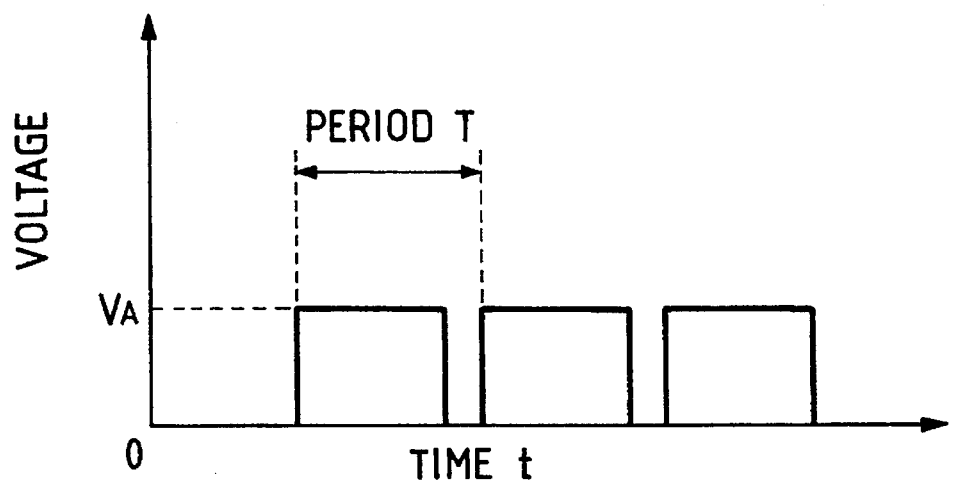
FIG. 7 is a diagram which shows an example of the wave shape of an input control signal from the outside according to the present invention.
Figure 8:
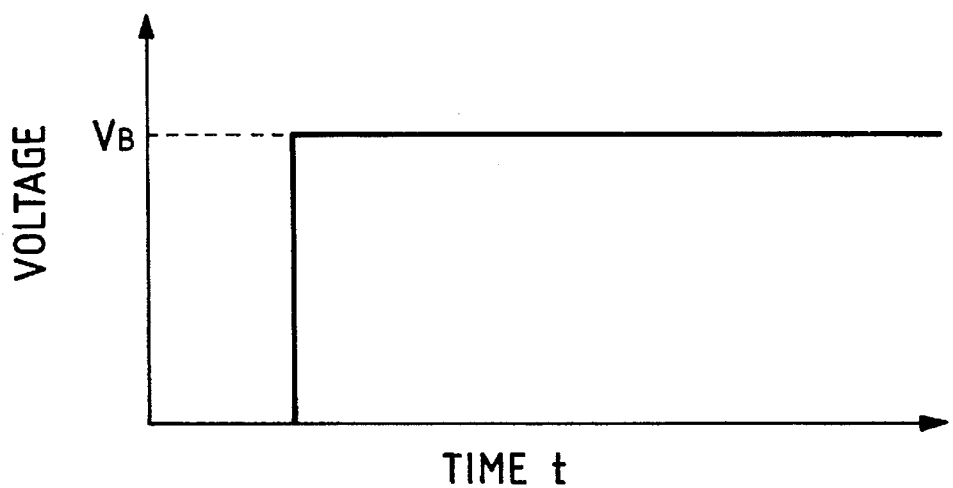
FIG. 8 is a diagram which shows an example of the wave shape of an output mode signal according to the present invention.

Now, a complementary explanation of the step 403 will be described. In the embodiment, it is necessary to distinguish the signals input to the C terminal, since the data output mode signal for requiring the self-diagnosis circuit 26 to output stored data is input to the C terminal, to which the signal for controlling the voltage adjustment from the outside referred to as an outside control signal) is also input. Now, the region to be used for each input signal is shown by the voltage-frequency space in FIG. 6. In the figure, the region a is used for the outside control signal and a signal different from the outside control signal in at least one of voltage and frequency can be selected as the output mode signal in the region b. For example, if a signal having duty of VA volts and a constant period T as shown by FIG. 7 is used for the outside control signal, the signal in the region b as shown by FIG. 8 can be used for the output mode signal. Since the outside control signal is different from the output mode signal in both voltage and frequency, the signals are easy to distinguish.

Then, in the embodiment, by setting the voltage VB of the output mode signal to the terminal voltage of the battery 5 and only connecting the C terminal and the terminal of the battery 5, the stored data is easily taken out without using a special device.

Furthermore, although a cathode-ray tube (CRT) is used for the display device in the embodiment, it is needless to say that any display device, such as a liquid-crystal panel, a LED panel and so on can be used. If a display device of a navigation system is also used as the display device of the present self-diagnosis circuit, the self-diagnosis function can be incorporated into one of the functions of the navigation system. In such case, it is possible to realize a system wherein the diagnosis results and the information on the charging generator system sent from the self-diagnosis circuit 26 are displayed by selecting self-diagnosis in a menu screen of the navigation system by which the output mode signal of the stored data is sent from the navigation system to the self-diagnosis circuit 26 via the C terminal 27.

One effect of the present invention is to give an alarm at the time of occurrence of an anomaly to an operator and to support a maintenance man or an inspector in confirming the situation at the time of such occurrence to allow them to inquire into the cause of the anomaly, by realizing a charging generator wherein anomalous states in it can be easily read out from the outside by simple means.

Another effect of the present invention is to execute more accurate self-diagnosis and to send information concerning the charging generator system successively to an operator and further to give a maintenance man or an inspector the information at the time of occurrence of the anomaly, by monitoring input and output signals of a control part using a diagnosis part, both parts being provided in a charging generator having diagnosis means according to the present invention.

Further, another effect of the present invention is to make outputting of the stored contents related with the charging generator or the voltage adjusting unit easier and to identify the anomaly situation more easily to a maintenance man or an inspector, by connecting to an information processor, such as a personal computer, as occasion demands.

What is claimed is:

1. A charging generator circuit, comprising a generator having an armature winding and a field winding and adapted to be driven by an engine, and a voltage adjustment unit for adjusting the output voltage of said generator by controlling field currents of said field winding, said generator adapted to provide an output to charge a battery wherein said voltage adjustment unit comprises:

self-diagnosis means, for diagnosing a control circuit of said voltage adjustment unit;

storage means in said self-diagnosis means, for storing data concerning states of said charging generator circuit, including diagnosis results; and output means for outputting data stored in said storage means, including the stored diagnosis results, in response to receipt of a stored-data-output-requiring signal received from outside said charging generator circuit.

2. A charging generator circuit according to claim 1, wherein said self-diagnosis means includes an input signal terminal, and circuit means for distinguishing a stored-data-output-requiring signal received at said input signal terminal, from an outside control signal from an engine control unit, also received at said input signal terminal, based on at least one of the received signal amplitude and the received signal frequency.

3. A charging generator circuit according to claim 1, wherein said storage means stores at least one of data concerning anomalous states of said charging generator circuit when an anomaly occurs and contents of the anomaly.

4. A charging generator circuit according to claim 1, wherein said output means includes at least one of display means for displaying outputs from said self-diagnosis means, and transmission means, for transmitting the diagnosis results to an output device outside of said charging generator circuit.

5. A charging generator circuit according to claim 2, wherein said voltage adjustment unit further comprises a control circuit for controlling the output voltage of said generator in response to the data concerning the states of said charging generator circuit, the voltage of said battery, the field currents, the rotation speed of said generator and the outside control signal from the engine control unit, and wherein said self-diagnosis means executes self-diagnosis based on the data concerning the states of said charging generator circuit, control signals output from said control circuit and the outside control signal.

6. A charging generator circuit according to claim 1, wherein said self-diagnosis means includes information display means adapted to be installed in a vehicle, for displaying stored data on the states of said charging generator circuit, including the diagnosis results.

7. A charging generator circuit according to claim 1, wherein said output means is adapted to output stored data from said storage means to a device capable of information processing which is connected to said output means.

8. A charging circuit according to claim 1, wherein said storage means is non-volatile so as to have the ability of keeping the stored data even in the case of power source interruption.

9. A charging generator circuit adapted to be driven by an engine of a vehicle for feeding currents to loads, comprising a generator; a voltage adjustment unit for adjusting the output voltage of said generator by controlling field currents of a field winding of said generator; and a battery charged by outputs of said generator, wherein said voltage adjustment circuit comprising:

self-diagnosis means, for diagnosing a control circuit of said voltage adjustment unit; and storage means in said self-diagnosing means, for storing data concerning states of said charging generator circuit, including diagnosis results provided by said self-diagnosis means, wherein said storage means maintains the data stored therein capable of being read out when said voltage adjustment unit is taken out from the vehicle.

10. A charging generator circuit comprising a generator adapted to be driven by an engine of a vehicle, for feeding currents to loads; and a voltage adjustment unit, for adjusting the output voltage of said generator by controlling field currents of a field winding of said generator, said generator adapted to provide an output to charge a battery, wherein said voltage adjustment unit comprises:

self-diagnosis means, for diagnosing a control circuit of said voltage adjustment unit;

storage means in said self-diagnosis means, for storing data concerning states of said charging generator circuit, including diagnosis results;

an information display device connected to said storage means and adapted to be installed in the vehicle, for displaying the stored data; and output means connected to said self diagnosis means and adapted to be connected to a utilizing device outside the vehicle, for outputting the stored data to the outside utilizing device.

11. A charging generator with a self-diagnosis function according to claim 9 or 10, wherein said storage means is formed by using nonvolatile memories.

12. A voltage adjustment unit for adjusting the output voltage of a generator which charges a battery in a vehicle by controlling field currents of the generator, said voltage adjustment unit comprising:

self-diagnosis means, for diagnosing a control circuit of said voltage adjustment unit;

storage means in said self-diagnosing means for storing data concerning states of said voltage adjustment unit, the generator, and the battery, including diagnosis results;

output means for outputting data stored in said storage means, including the stored diagnosis results, in response to receipt of a stored-data-output-requiring signal received from outside the voltage adjustment unit; and a control circuit for controlling the output voltage of the generator in response to the stored state data, the voltage of the battery, the field currents, the rotation speed of the generator, and an outside control signal.

* * * * *